April 27, 1943.    C. V. BAUMAN    2,317,717
AUTOMATIC FLUID TEMPERATURE REGULATOR
Filed Dec. 2, 1938    2 Sheets-Sheet 1
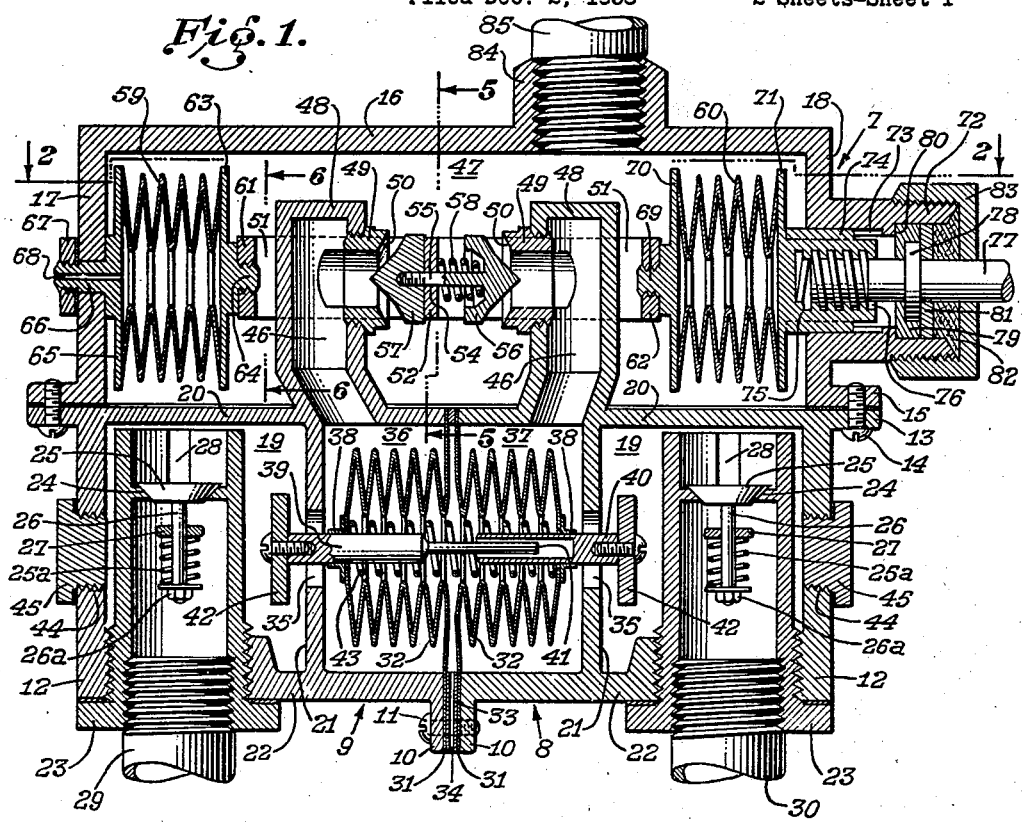
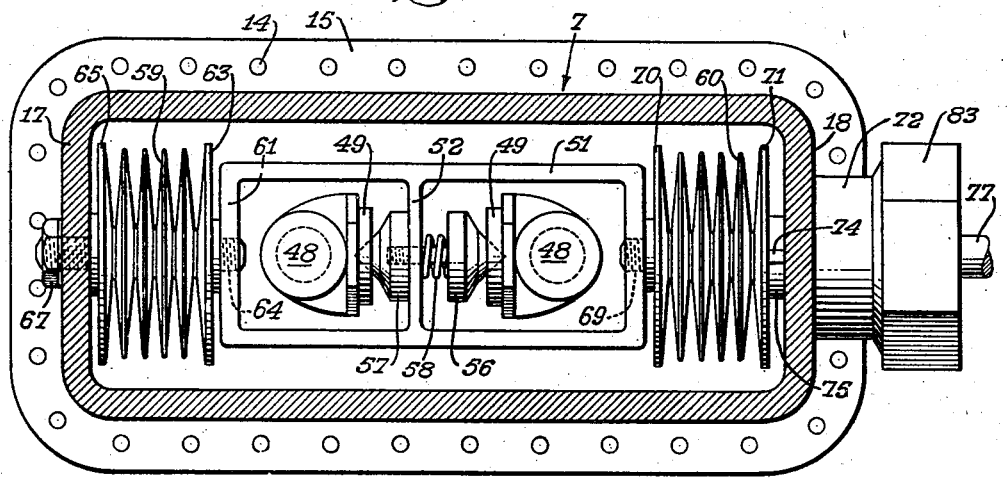
INVENTOR
CARL V. BAUMAN
BY Joseph F. Westall
ATTORNEY April 27, 1943. C. V. BAUMAN 2,317,717
AUTOMATIC FLUID TEMPERATURE REGULATOR
Filed Dec. 2, 1938 2 Sheets-Sheet 2
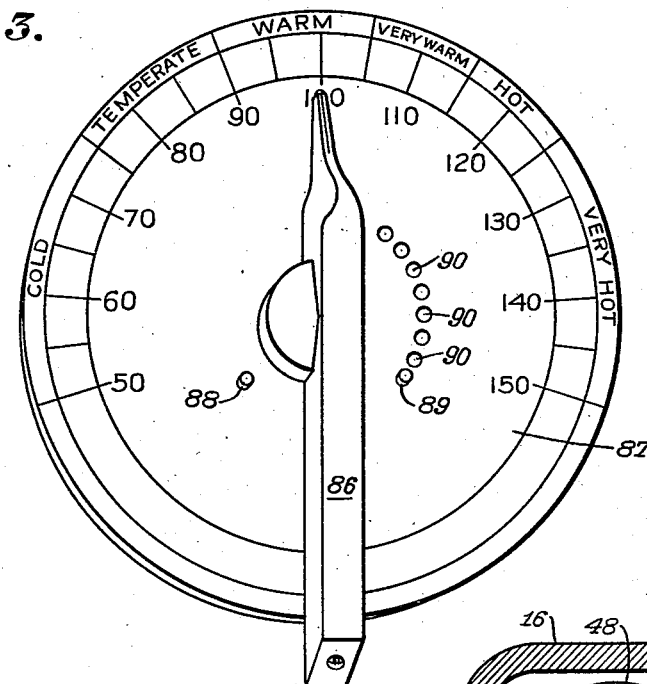
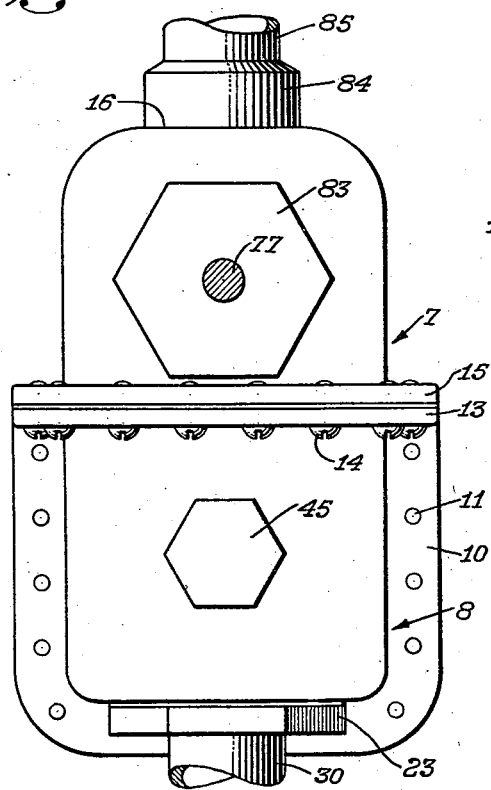
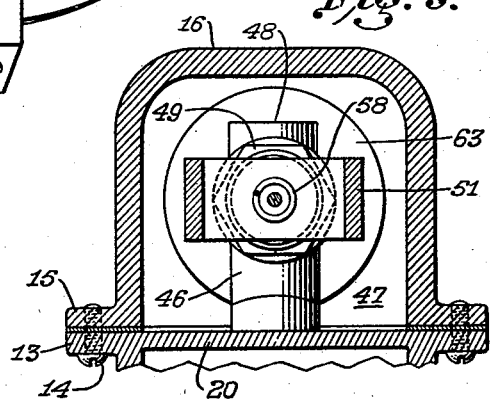
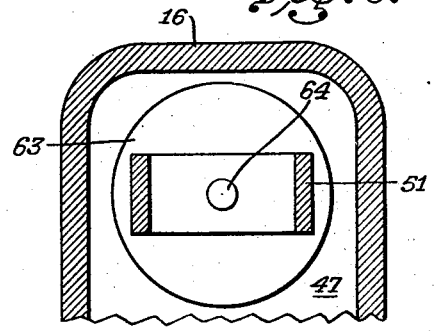
INVENTOR
CARL V. BAUMAN
BY Joseph F. Westall
ATTORNEY Patented Apr. 27, 1943

2,317,717

UNITED STATES PATENT OFFICE 2,317,717

AUTOMATIC FLUID TEMPERATURE REGULATOR

Carl V. Bauman, Three Rivers, Calif.

Application December 2, 1938, Serial No. 243,573

9 Claims. (Cl. 236—12)

This invention relates to fluid temperature regulators, and contemplates apparatus embodying a mixing chamber adapted to receive streams of fluid of different temperatures to produce a single stream having a predetermined temperature between the temperatures of the individual streams from which the fluid produced is drawn.

It is a general object of the invention to provide a compact device having a means of connection for hot and cold fluid inlet conduits, controlled by valves actuated throughout their opening and closing movement by a thermostat located within a mixing chamber.

Another object is to provide a bellows type thermostat arranged in the flow of fluid of the mixing chamber wherein the sensitiveness of the thermostat may be most effectively utilized, in combination with means to counteract variations in fluid pressure on the thermostat.

Another object is to provide resilient means normally adapted to maintain the valves controlling the inlets of the mixing chamber in a predetermined position, but adapted to compress to relieve strain upon the thermostat incident to adjustment of the thermostat to change the temperature of the fluids produced from hot to cold.

Another and highly important object is the provision of pressure balancing and regulating means adapted to maintain fluids entering the mixing chamber under equal pressure to insure exclusive control of the mixing valves by the thermostat and manual control thereof.

Another object is to provide an indicator for regulating the operation of the thermostat and a dial embodying means to variably limit the manipulation of the indicator and thereby establish a desired maximum temperature of the flow emitted from the mixing chamber of the device.

Still another object is to provide check valves to prevent back flow of the fluid when the tap controlling flow of fluid in the outlet pipe is closed and the device is inoperative.

Other objects and salient features of my invention such as economy and simplicity of construction, ease of operation and assembly, and freedom from friction between moving parts minimizing their tendency to become clogged or worn, will be apparent to those of skill in the art from an examination of the following description read in the light of the accompanying drawings, in which:

Fig. 1 is a sectional view of the mixing device of my invention;

Fig. 2 is a sectional view taken on lines 2—2 of Fig. 1;

Fig. 3 is an elevation of the dial and indicator by which the thermostat is regulated;

Fig. 4 is an end elevation of the casing in which the apparatus is located;

Figs. 5 and 6 are sectional views taken on correspondingly numbered lines of Fig. 1.

Referring to the drawings in detail, the numerals of which indicate similar parts throughout the several views, 7 designates a composite casing comprising a lower portion of two U-shaped sections, 8 and 9, each having a flange 10 at one of their ends. Flanges 10 of respective sections are secured together as by screws 11. The outer opposite ends of each section are closed by walls 12. The upper edge of each lower portion of the casing is flanged as at 13 through which screws 14 extend to secure the lower portions 8 and 9 of the casing to a flange 15 integral with the edges of an upper inverted U-shaped casing section 16. End walls 17 and 18 close opposite ends of the casing section 16. An inlet chamber 19 is formed in each lower casing section 8 and 9 adjacent its end 12 by a horizontal closure 20 connecting the upper opposite edges of the sides of the U-shaped sections and which separate the lower portions 8 and 9 from the upper portion 16 of the casing, and a transverse partition 21 intermediate the ends of each lower section.

The bottom 22 of each casing section forming the floor of the inlet chambers is formed with an opening into which a tube 23 is threaded. Intermediate the ends of each tube the bore is restricted to provide an upwardly facing valve seat 24 on which a check valve 25 is normally seated. A valve stem 26 extends downwardly from each check valve 25, and is maintained in coaxial alignment with the tubes 23 by guides 27 integral with respective tubes. A spring 25a encircles each stem 26 between the guide 27 and a nut 26a threaded on the lower end of the stem to resiliently maintain the valve on its seat. Above each check valve 25 the tubes 23 are longitudinally slotted as at 28 for a purpose about to be described. The outermost end of each tube is internally threaded to receive, respectively, hot and cold fluid inlet pipes 29 and 30. The hot and cold fluids entering tubes 23 under pressure will raise valves 25 against the tension of spring 25a and flow into the respective inlet chambers 19 through the slots 28.

As above noted, the open ends of the lower casing sections 8 and 9 are secured together by screws 11 extending through their flanged edges 10. Between the flanges 10 and the adjoining edges of the closure 20 of the respective U-shaped members, the annular edge 31 of one end of each of a pair of bellows 32 are clamped, being spaced apart by gasket 33 having a radial opening therethrough, which provides a vent 34 for the interior of the bellows, communicating with the area outside the casing. From each inlet chamber 19 the fluid flows through ports 35 in respective partitions 21 into hot and cold pressure control chambers 36 and 37, formed between the respective partitions 21 and the clamped ends 31 of the bellows, which ends centrally divide the area between the partitions 21 of the joined lower casing sections. The bellows 32 extend into each pressure control chamber and the outer ends thereof are secured to annular flanged members 38 mounted on respective valve stems 39 and 40 which extend axially through the bellows. Stem 40 is hollow to receive a coaxial, diametrically reduced extension 41 of the other valve stem 39, whereby said stems are maintained in axial alignment. The opposite ends of valve stems 39 and 40 extend through respective ports 35 and have secured to their ends by suitable means within the respective inlet chambers 19, poppet type valves 42 adapted to close ports 35. A helical spring 43 encircles the valve stems 39 and 40 within the bellows 32 and bears at its opposite ends against the annular flanged members 38 to normally urge valves 42 apart and in open position. The bellows 32 are adapted to be compressed by fluid pressure against either end thereof adjacent the respective ports 35, but are composed of a firm material to resist sagging whereby they support the dual valve assembly just above described.

The spring 43 normally resists the tendency of the valves to close in response to the pressure fluid entering the pressure control chambers 36 and 37 through ports 35, but may be compressed by pressure exerted against both bellows 32. It will also be observed that where the pressures of the hot and cold fluid streams is different, the excess pressure of one stream exerted on one of the bellows will collapse the bellows nearest adjacent the port in which the pressure is greater, causing the valve 42 controlling that port to move toward closed position and simultaneously moving the other valve to a more widely opened position to equalize the pressure of the flow of fluid through each port 35.

In order to facilitate assembly and cleaning of the pressure control mechanism when necessary, an opening 44 is provided in each end wall 12 of the lower sections 8 and 9 in axial alignment with the valve stems 39 and 40, as will be obvious. Openings 44 are normally closed by plugs 45.

Integrally formed with the horizontal closure 20 of each U-shaped member 8 and 9, is a tubular projection 46 extending upwardly from the pressure control chambers 36 and 37 into the mixing chamber 47 formed by the walls of the upper casing section 16. The upper end of each tubular projection 46 is closed as at 48. A valve insert 49 is threaded into relatively aligned openings in adjacent walls of the tubular projections, each insert being formed with a conical valve seat 50. Hot and cold water is admitted into the mixing chamber 47 from the chambers 36 and 37 through the respective tubular projections 46 and inserts 49.

A rectangular floating frame 51 is supported by means later described, over both of the projections 46 in longitudinal alignment with the bore of valve inserts 49. A cross bar 52 extends between opposite sides of the frame and between the tubular projection. A hole 54 is bored through cross bar 52 in axial alignment with the bores of the valve inserts 49. A valve stem 55 is slidably carried in hole 54 and has integrally formed with one end thereof a conical cold water valve 56, adapted to coact with one of seats 50 to control the ingress of cold water into mixing chamber 47. On the opposite end of valve stem 55 a conical hot water valve 57 is threaded to similarly control the ingress of hot water into the mixing chamber. A helical spring 58 encircles the stem between valve 56 and bar 52 to normally retain valve 57 against the guide. Valves 56 and 57 are adapted to seat on the respective valve seats 50 by movement of frame 51 in a direction parallel to valve stem 55 as will be hereinafter more in detail described, but are prevented from seating simultaneously due to the fact that the length of the stem 55 and valves 56 and 57 is less than the distance between the valve seats 50.

The frame 51 is supported movably within the upper casing section 16 by means of a balancing bellows 59 at one end of the frame and a thermostatic bellows 60 at its opposite end. A circular plate 63 is threaded into one end 61 of the frame by an integral central hub 64, threaded into the adjacent flange 61 at one end of the frame. One end of a balancing bellows 59, above alluded to, is secured to the periphery of plate 63 by any suitable means. The opposite end of bellows 59 is similarly secured to the periphery of another plate 65 having a central hub 66 extending through the adjacent end wall 17 of the upper casing section. A nut 67 is threaded on the outer end of hub 66 to secure immovably the end of the bellows adjacent end wall 17. Hub 66 is formed with a central bore comprising a vent 68 communicating the area within the bellows 59 with the atmosphere. While the bellows may be extended and contracted on its axis, it is composed of a material which resists sagging so as to support the end of the frame 51 to which it is attached.

A hub 69 of a circular plate 70 is threaded into the end 62 of frame 51, to the periphery of which a thermostatic bellows 60 is attached. The opposite end of bellows 60 is attached to the periphery of a circular plate 71 which is disposed adjacent the end wall 18 of the top portion 16 of the casing 7. Bellows 60 is filled with a fluid highly sensitive to expansion by heat. The end wall 18 is formed with an outwardly extended nipple 72 to encase the thermostatic control mechanism about to be described.

The end of the bore of nipple 72 adjacent the interior of the casing is formed with a pair of longitudinally-arranged key ways 73, with which keys 74 formed integrally with the periphery of a hollow central boss 75 of plate 71, coact, whereby the boss may be moved axially within nipple 72 to extend or contract this thermostatic bellows 60 while the engagement of the key 74 with the key ways 73 prevents rotation of the boss. The bore 76 of the hub is threaded to receive the end of a control shaft 77. Shaft 77 is held against axial movement relative to the nipple 72 and casing 7 in order that its rotation will move the boss 75 and plate 71 axially as noted above, by an annular flange 78 integral with the shaft and rearwardly of its threaded end. Flange 78 is clamped between a washer 79, seated on an annular shoulder 80 within nipple 72, and a washer 81 held against the opposite side of the flange by packing 82 compressed thereagainst by a cap nut 83 threaded on the exterior of the nipple.

A hollow internally threaded nipple 84 is formed with the top of the casing into which an outlet pipe 85 is secured for the flow of fluids of the desired predetermined temperature to the point of use.

An indicator 86 (Fig. 3) is secured to the outer end of shaft 77, by which the shaft may be rotated to effect adjustment of the thermostat 60 as hereinafter described. A dial 87 encircles the shaft under indicator 86 and has delineated on one segment of its edge zones and degrees to indicate the range of temperatures of the fluid the apparatus is adapted to produce. A stop 88 is threaded in the dial by suitable means intermediate its center and periphery at the end of the range of movement of the indicator effective to produce cold water. Another stop 89 is threaded into an opening at the opposite end of the effective range of movement of the indicator. A series of threaded openings 90 are bored in the dial in an arc having a center coinciding with and spaced from the center of the dial a distance equal to the distance of the stops 88 and 89 therefrom, and on radii, respectively, of the degree calibrations of the higher temperatures as delineated on the face of the dial. Stop 89 may be threaded into any of the openings 90 to vary the range of movement of the indicator and coincidentally, the temperatures available in the fluid flow from pipe 85. This variation in the limit of movement of the indicator to the points on the dial designating the higher temperature is a feature principally adapted for use where the device is employed by children to prevent inadvertent movement of indicator 86 for production of temperatures in the water flowing from the device which might scald the user.

The operation of my invention is briefly described as follows: The mixer is installed with the usual hot and cold water pipes 29 and 30, threaded into respective tubes 23. Water flowing into the tubes will raise the check valves 25 and flow through slots 28 and into the pressure control chambers 36 and 37, respectively, through ports 35. Valves 42 will normally be disposed in approximately the same degree of open position to permit an equal volume of water to flow into each pressure control chamber. As above noted, however, if the pressures of hot and cold water streams are different, the excess pressure of the fluid will cause the bellows 32 against which the fluid flows, to contract slightly and coincidentally more widely open the other valve with the result that the passages through the respective ports 35 will be restricted and enlarged to a degree sufficient to equalize the pressures in each pressure control chamber 36 and 37. It will be observed that by reason of vent 34 through gasket 33 between the adjoining ends of the bellows, atmospheric pressure will be maintained within the bore of bellows, thereby insuring that their operation will be affected only by the pressure of the water flowing thereagainst. The water in each chamber 36 and 37 immediately flows upwardly into the bore of the respective tubular projections 46.

The thermostat mechanism is constructed and arranged so that with the indicator in a position on the dial designated as "cold," i. e., to the left side of the dial, and the thermostat fully contracted, the hot water valve will be in closed position with spring 58 fully extended. Thus with such adjustment the hot water entering the tubular projection will be prevented from flowing into mixing chamber 47. The cold water valve 56 will, however, be wide open to permit the water of the temperature indicated on the dial to pass from the mixing chamber into the outlet pipe 85 and thence to a place of use. Should indicator 86 be moved clockwise to a zone on dial 87 indicating a higher temperature, the boss 75 and plate 71 of the thermostat will be moved by such manipulation of the indicator to widely open the hot water valve 57 and partially shut off the entrance of the cold water into the mixing chamber from chamber 37. Hot water entering the mixing chamber will immediately affect the thermostat so as to cause expansion of the bellows 60 and thereby return the frame 51 slightly to the left to partially close the hot water valve 57, i. e., a distance sufficient to admit through valve 57, hot water in an amount whereby the temperature indicated on dial 87 is produced in fluid in chamber 47. The excessive amount of hot water entering mixing chamber 47 as a result of a substantial change in the adjusted position of the indicator will expedite a change in the temperature of the water to the temperature desired.

Similar adjustments of the thermostat will affect similar changes in the temperature of the water mixed within the chamber. Increases in pressure of the water within mixing chamber 47 which tends to compress the thermostatic bellows 60 and thereby influence the disposition of the frame 51 and valves 56 and 57, is offset by the same pressure and effect on the balancing bellows 59.

It will be observed that I have provided a mixing device comprising a minimum number of parts substantially free in operation from friction, in which the pressure of hot and cold fluid entering the mixing chamber is substantially equalized to insure against variations in the influence of pressure of the fluid on the inlet control valves, and including means to counteract the effect of variations in pressure of the fluid within the mixing chamber, on the thermostat, whereby fluids of extreme temperatures may be mixed effectively and the temperatures of the mixed fluid positively controlled at all times, desired changes in temperature of the fluid being effected substantially instantaneously.

While I have described but one embodiment of my invention, it will be understood that numerous changes in size, design, shape, and number of the various parts may be made without departing from the spirit of my invention as defined by the appended claims.

What I claim and desire to secure by Letters Patent is:

1. In a device of the character described, a casing, partitions in said casing forming a pair of inlet chambers and a pressure control chamber, pipes leading into said inlet chambers, respectively, valve means controlling communication between said pipes and inlet chambers, respectively, adapted to open to pressure in said pipes, bellows in said pressure control chamber movable in response to pressure of fluid entering said pressure control chamber through ports in said partitions, and valve means controlling said ports respectively actuated by said bellows, and movable independently of one another throughout their range of movement, and resilient means to resist compression of said bellows.

2. In a device of the character described, walls forming a pressure control chamber, means to direct hot and cold water into said chamber from opposite sides thereof, a bellows in said pressure control chamber in the path of the flow of both hot and cold water, and valve means movable independently of one another throughout their range of movement and actuated by said bellows for controlling passage of hot and cold fluids, respectively through said first-named means.

3. In a device of the character described, a casing, walls in said casing forming a pressure control chamber and a mixing chamber, a partition dividing said pressure control chamber, means communicating said mixing chamber and said pressure control chamber at each side of said partition, a hot water conduit and a cold water conduit communicated with said pressure control chamber at opposite sides of said partition, respectively, independently movable valve means controlling flow into said pressure control chamber through said conduits respectively, means in said pressure control chamber actuated by pressure thereagainst of fluid entering said control chamber from said hot and cold water conduits to urge both of said valve means toward closed position simultaneously.

4. In a device of the character described, walls forming a pressure control chamber, a pair of bellows joined at one end and communicated with one another, a pair of valve stems connected to the outer ends of said bellows, respectively, and movable with respect to each other, said stems extending through ports in the walls at opposite sides of said bellows, and valve means secured to each of said valve stems to control said ports, said bellows being movable toward collapsed position in response to pressure of fluid entering said ports thereagainst to control said valve means.

5. In a device of the character described, a casing comprising ported partitions therein forming walls of a mixing chamber and of a pressure control chamber and of a pair of inlet chambers, valve means controlling each of a pair of said ports communicating respective inlet chambers and pressure control chamber, and valve means controlling a pair of said ports communicating said pressure control chamber and said mixing chamber, means within said pressure control chamber actuated by the pressure of fluid thereagainst to vary the position of said first-named valve means independent of one another, and a thermostat within said mixing chamber controlling the position of said second valve means.

6. In a device of the character described, a casing having partitions therein forming a pressure control chamber and a fluid inlet chamber at each side of said pressure control chamber, said partitions having a pair of inlet ports and a pair of outlet ports therein, a pair of collapsible bellows, each of said bellows having one of their ends attached to the casing to divide said pressure control chamber, a pair of valve stems extending through said ports, respectively, the ends of said bellows opposite to the ends thereof connected to the casing being attached to said valve stems respectively, resilient means to urge said valve stems apart, said bellows being operable to move said valves alternately and simultaneously toward closed position in response to variations in pressure of fluid flowing into said pressure control chamber through said ports, respectively, to equalize pressure of fluid flowing through said outlet ports.

7. In a device of the character described, a casing, means forming a mixing chamber and a pair of pressure control chambers within said casing, said casing having a pair of ports opening into pressure control chambers, respectively, means of communication between each of said pressure control chambers and said mixing chamber, said mixing chamber having an outlet opening, means to direct fluid under different pressures into said pressure control chambers, respectively, through said inlet openings, means in said pressure control chambers to limit to a predetermined maximum value and equalize pressure of the fluid within said last-named chambers, and means controlled by the temperature of fluid in said mixing chamber to vary the quantity of fluids admitted into said mixing chamber from said control chambers, respectively.

8. In a device of the character described, a casing inclosing pressure control mechanism, said casing having a pair of inlet openings therein, a valve for each of said inlet openings, and means operable in response to pressure within said casing to urge both of said valves toward closed position when the pressure of fluid entering said casing through the openings controlled thereby, respectively, reaches a predetermined value, said last-named means being effective upon actuation to alleviate the urge upon one of said valves in response to movement of the other of said valves toward closed position.

9. In a device of the character described, walls forming a pressure control chamber, separate means to direct hot and cold water into said chamber, bellows in said pressure control chamber exposed to the pressure of hot and cold water passing through said first-named means, valve means actuated by asid bellows movable independently of one another throughout their range of movement for controlling the flow of hot and cold fluid, respectively, through said first-named means, guide means for said valve means, and means to enclose said guide means from contact by fluid entering said pressure control chamber.

CARL V. BAUMAN.